Feb. 10, 1925.
J. A. MURPHY
MOLDING MACHINE
Filed Feb. 5, 1923     2 Sheets-Sheet 1
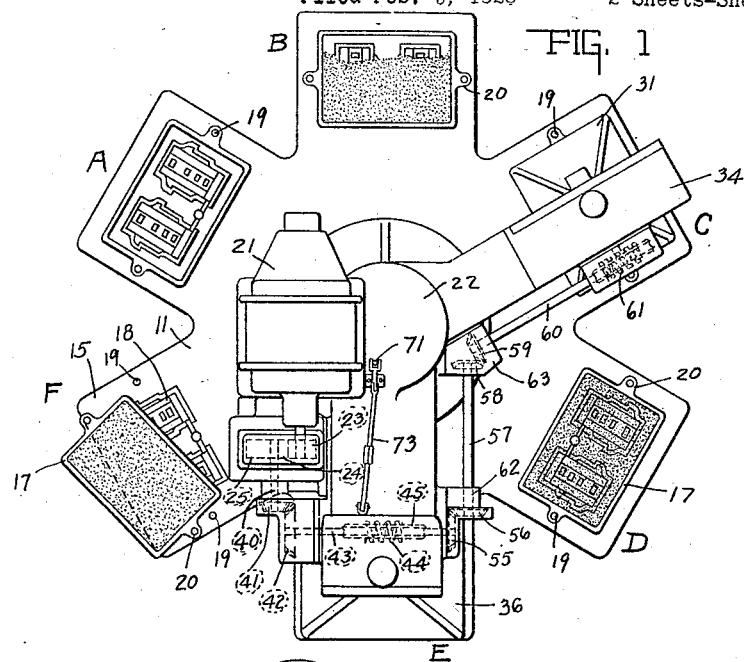
INVENTOR.
JAMES A. MURPHY.
BY
ATTORNEYS.

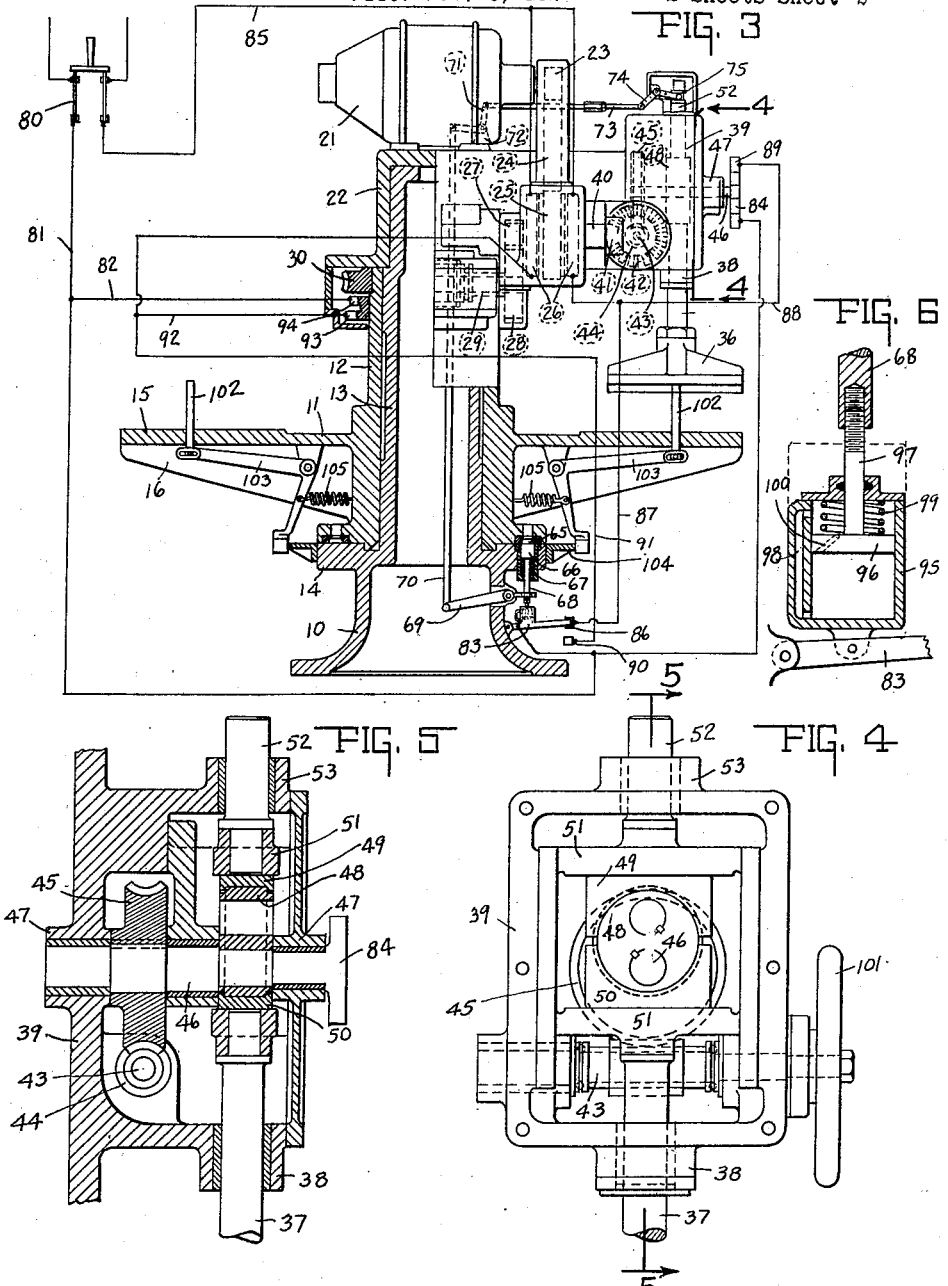

Patented Feb. 10, 1925.

1,526,078

UNITED STATES PATENT OFFICE.

JAMES A. MURPHY, OF HAMILTON, OHIO.

MOLDING MACHINE.

Application filed February 5, 1923. Serial No. 617,009.

*To all whom it may concern:*

Be it known that I, JAMES A. MURPHY, a citizen of the United States, and a resident of Hamilton, county of Butler, and State of Ohio, have invented a certain new and useful Molding Machine; and I do hereby declare that the following is a full, clear, and exact description thereof, reference being had to the accompanying drawings, in which like numerals refer to like parts.

This invention relates to a molding machine, and to certain improvements therein for making iron or other castings.

The principal object of the invention is to provide a machine of this character of a semi-automatic nature which will be simple in construction and accurate in its operation.

One feature of the invention resides in the automatic drive for rotating the table, stopping and aligning the same when the molds are brought in position to be operated upon, and actuating the peening and pressing heads upon the table being brought to a stop, all of which rotating and actuating means is driven from a single source of power and automatically controlled by a clutch mechanism.

Another feature of the invention resides in the means for actuating and controlling the sprue pins whereby they will be caused to extend through the mold and be withdrawn therefrom at proper intervals.

Still a further feature of the invention relates to the electric timing control for automatically actuating a magnetic clutch, whereby the table will be rotated and the heads reciprocated at timed intervals and in proper relation to each other.

The invention further consists in providing an automatically driven peening head, wherein the nature of the pattern is such as to require peening, whereas it has heretofore been necessary to peen by hand. Patterns requiring peening could not be used with an automatic machine. However, this invention overcomes that difficulty by providing a peening head which is automatically driven by the machine for that purpose, as will be hereinafter more fully described in the specification and claims.

The full nature of this invention will be understood from the accompanying drawings and the following description and claims.

In the drawings Fig. 1 is a plan view looking down upon the machine. Fig. 2 is a front elevation thereof. Fig. 3 is a central vertical cross section taken through a portion of the machine. Fig. 4 is a section taken on the line 4—4 of Fig. 3. Fig. 5 is a section taken on the line 5—5 of Fig. 4. Fig. 6 is an enlarged section of a dash pot mechanism.

In the drawings there is shown a molding machine supported upon the base 10 having a revolving table 11 formed integral with the rotating sleeve 12 adapted to be supported by, and rotatable about, the central upright supporting column 13 extending from the base 10. Said base 10 is also provided with an annular supporting flange or bearing plate 14 for supporting the weight of the table and sleeve 12, as shown in Fig. 3. The table 11 has formed thereon a plurality of extensions or stripping plates 15 braced by the webs 16. As shown in Fig. 1, there are six stripping plates about the table corresponding to the six operations of the machine, for supporting the molding flasks 17 and the patterns 18 in position. The flasks 17 are secured in position by means of the pins 19 projecting upwardly from the stripping plates in position to engage in suitable holes provided in the ears 20 on each end of the flask.

When the table is rotated, as will be hereinafter described, the operator places the empty flask on the plate at the position A. As the plate rotates and comes to rest at the position B, sand is loaded by an operator or a hopper in any suitable manner. When the plate reaches the position C, the sand is peened by a peening head, and upon reaching the position D additional sand is added to the mold and struck off. When the plate reaches the position E, the sand is pressed and the pattern stamped therein, and when it reaches the position F, the flask and the molded sand therein is lifted from the pattern and removed from the stripping plate.

The table 11, and the stripping plates thereon, are rotated and driven by the electric motor 21 mounted on the housing 22 supported upon a shoulder on the supporting column 13. The motor directly drives the pinion 23 which is connected by the silent chain 24 to a gear 25 associated with a magnetic clutch structure 26. When the table driving circuit is mechanically thrown in, the pinion 27 is driven thereby, which meshes with the gear 28 keyed on the shaft 29 which is provided with a worm for meshing with and driving the worm gear 30. Said worm gear is keyed on the rotating sleeve 12, whereby said sleeve and table will be rotated through the above described mechanism.

The sand is peened by the peening head 31 being forced downwardly on to the sand and having a plurality of projections 32 on the under face thereof. Said head is supported by the vertical rod 33 extending into the housing 34 and vertically slidable in the bearing 35.

When the mold reaches the position E it is pressed and stamped by the pressing head 36, which is provided with a molding surface 137 thereon. The molding surface or pattern 137 molds the upper surface of the sand so that it will be properly shaped to cooperate with the molded sand contained in the flask mounted on top of it, after it is removed from the machine. The head 36 is mounted on the rod 37 which is vertically slidable in the bearings 38 formed on the housing 39.

The rod 37 is reciprocated for pressing and stamping the mold at the position E. For reciprocating the rod 37, the motor 21, driving the clutch sprocket 25, as above described, will drive the shaft 40 when the corresponding clutch member is electrically thrown into connection. The shaft 40 drives the beveled pinion 41 which meshes with a beveled gear 42 mounted on the shaft 43, which extends through the housing 39 and has keyed thereon the worm 44. Said worm meshes with the worm gear 45 keyed upon the shaft 46, which is mounted in suitable bearings 47. Keyed on a reduced portion of the shaft 46 there is an eccentric 48 mounted between the driving blocks 49 and 50. Said blocks are slidably mounted in the reciprocating frame 51 so as to slide laterally therein, and said frame 51 is slidably mounted in the housing 39 so as to slide vertically in suitable keys therein. The shaft 37 is secured to the lower portion of the sliding frame 51 so that the action imparted thereto is that imparted to any connecting rod or the like, the frame 51 being in the nature of a reciprocating piston. The projection 52 extending through the bar 53 in the top of the housing, acts as a guide therefor. It will, therefore, be observed that when the head clutch 26 takes hold so that the shaft 46 is rotated, there will be a reciprocating piston-like movement. When the eccentric 48 is in the position shown in Figs. 4 and 5, the head is elevated. As shown in Fig. 2, it is in the reverse position, or lowered into pressing and stamping position.

The same mechanism is contained in the housing 24 for actuating the peening head 31 in exactly the same manner. The housing 34 encloses a mechanism identical with that enclosed by the housing 39, which mechanism is driven from the shaft 43 through the gear 55 meshing with the bevel gear 56 keyed to the shaft 57, upon which is keyed the bevel gear 58, meshing with the gear 59 which is keyed to the shaft 60 which drives the worm 61 in position to mesh with a worm wheel similar to the worm wheel 45. The shafts 57 and 60 extend at an angle to each other and are supported in the bearings 62 and 63. It will be observed, therefore, that the same driving mechanism that reciprocates the head 36 will also reciprocate the head 31. Naturally, therefore, the heads 31 and 36 reciprocate simultaneously.

The rotation of the table 11 is periodically arrested as the stripping plates and flasks carried thereby come into a given position to be operated upon. For arresting said table there is provided a beveled recess 65 into which the plunger or pin 66 is adapted to extend and wedge for aligning the table in position. The pin 66 is normally forced against the under surface of the revolving table by the compression spring 67, and is provided with a stem 68 extending downwardly therefrom. The head of the stem 68 is engaged by the fulcrum lever 69 provided on the base and pivotally connected with the rod 70 at the opposite end. When the rod 70 is elevated the pin 66 is pulled down against the spring 67 so that it disengages the recess 65, permitting the free rotation of the table. As soon as the table starts to rotate and the rod 70 is let down, the spring 67 forces the pin 66 into engagement with the under side of the table, but it will slide thereon and not stop the rotation thereof until the next recess comes into alignment therewith. It will then be forced into the recess by the spring 67, bringing the table to a stop in the proper position for the next operation. A recess 65 is provided for each of the stripping plates so that when the pin 66 engages in one of said recesses, the stripping plates will be properly positioned.

The rod 70 extends upwardly through the hollow supporting column 13 to a bell crank lever 71 pivotally mounted on the ear 72 secured on the housing 22. Said lever is connected by the rod 73 to a bell crank lever 74 pivotally mounted on the housing 39. The free end of the bell crank lever engages in the collar 75 of the guide portion 52 of the stem 37 so that when the heads 36 and 31 are simultaneously elevated, the rod 70 will be raised and the pin 66 withdrawn so as to permit the table to rotate, and when said heads are lowered into the flasks, the rod 70 is released so as to permit the pin 66 to engage the table and maintain it in fixed position.

The magnetic clutch is controlled by make-and-break timing switches embodied in the following described circuits. There is a main line circuit connected with the switch 80 from which a line 81 or a ground connects with a rotatable sleeve 12, through the line 82, and to the switch lever 83 and contact ring 84 mounted on the shaft 46. The line 85, leading from the switch 80, connects with the one terminal of each of the clutch members 26. The contact point 86, in position to be engaged by the switch lever 83, connects through the line 87 with the other terminal on the head clutch 26 which is also connected through the line 88 with the contact brush 89 in position to contact with the ring 84. The other contact point 90, which is mounted in position to be engaged by the switch lever 83, is connected through the line 91 with the other terminal of the driving clutch 26. The line 91 is also connected through the line 92 with the contact brush 93 positioned to engage the ring 94 with which the ground line 82 is connected.

Mounted on the lower end of the stem 68 there is a timing dash pot comprising a cylinder 95 pivotally connected to the switch lever 83 and having a piston 96 mounted on a stem 97, which may be screwed into the stem 68 so as to be adjustable with respect thereto. The dash pot cylinder 95 is provided with a passage 98 connecting the ends thereof on each side of the piston 96, and there is a spring 99 positioned between the piston and the top of the dash pot so as to normally force the dash pot cylinder upwardly on the piston, since the piston is held in fixed relation to the stem 68. The dash pot is filled with oil or similar liquid so that the movement caused by the spring 99 will be limited or timed by the passage of the oil through the passage 98. Further the piston is provided with a valve 100 so as to permit the free passage of oil therethrough when the piston and cylinder move in the opposite direction relative to each other.

The operation of the electric control is as follows: Assuming that the mechanism is in the position shown in Fig. 3, the switch 80 is closed so that there will be a current directed through the switch lever 83 to the head clutch 26 so that said clutch will be magnetized and thrown into connection, whereby the shaft 40 will be driven from the motor 21. The heads 36 and 31 will then be actuated so that they will move downwardly for peening and impressing the sand in the molds. At the same time the brush 89 is in contact with the contact ring 84, which also completes the circuit with the head clutch 26. During this operation, and while said head clutch is in engagement, the contacts in the line connecting the driving clutch 26 are broken. That is, the switch lever 83 is out of engagement with the contact 90 and the brush 93 is out of contact with the contact ring 94. Therefore, the table is not rotated and the pin 66 holds it in fixed position. After the heads 31 and 36 have been completely lowered, they are carried upwardly so that when they reach a certain position in their upward movement, the pin 66 is withdrawn from the table so as to permit it to revolve. Such movement of the pin 66 forces the switch lever 83 downward, breaking its engagement with the contact 86. However, in the meantime current reaches the head clutch 26 through the brush 89 and ring 84 so that the heads 31 and 36 continue their operation. Upon the switch lever 83 being forced further downwardly it engages the contact point 90 which causes the current to pass therethrough, carrying the driving clutch member 26 into engagement, whereby the table will be rotated. As the table is started to rotate and the heads 31 and 36 reach their uppermost position, the head clutch 26 is thrown out of engagement, since the contact ring 84, which is provided with an insulated section in its periphery, is turned to such position that the brush 89 engages the insulated section thereby breaking that contact. The heads 31 and 36 are thereafter brought to a stop at their uppermost position.

Upon the table starting to rotate and carrying with it the ring 94, the brush 93 having been in engagement only with an insulated section in its periphery, it is brought by such rotation into electrical contact therewith so as to also complete a circuit through that source, and the table continues its rotation. In the meantime the dash pot control elevates or draws up the switch lever 83 from engagement with the contact 90 to a neutral position betwen said contact and the contact 86, by reason of the spring 99 forcing the same up against the piston 96, said upward movement being timed by the flow of oil through the passage 98. This breaks the circuit through the contact 90, but the table continues to rotate by reason of the contact between the brush 93 and the ring 94, until the table is turned to a position wherein the pin or plunger 66 may be forced into the recess 65 by the spring 67. At such position the table is arrested by the engagement thereof and the driving power therefor is disconnected by reason of the brush 93 engaging an insulated section on the ring 94. Said sections are so placed about the ring as to time their engagement by said brush with the engagement of the recess 65 by the pin 66. Simultaneously the movement of the pin 68 brings the switch lever 63 into engagement with the contact 86, closing the circuit to the head clutch 26, whereby the heads 31 and 36 will be again operated as above described. For manually operating the heads 31 and 36 when the power is thrown off, there is provided a hand wheel 101 mounted on the shaft 43. The operation of said hand wheel will also control the movement of the pin 66 so that the table may also be turned by hand for any desired purpose.

For providing an opening or passageway through the sand to the pattern gate there are sprue pins 102 reciprocably mounted in the stripping plates 15 so as to extend upwardly therethrough. The bell cranks 103 are pivotally connected to the bottom of the table and have one end pivotally connected with the lower end of the sprue pins and the other end extending downwardly in engagement with the periphery of a cam 104 which is secured to the base 10. The bell cranks 103 are also yieldingly connected with the table by the springs 105 so that as the table rotates the cams 104 causes the sprue pins 102 to slide up and down in the stripping plates. Said cam 104 is so shaped as to cause the sprue pins to extend upwardly through the mold and provide a core for the gate passage, and be withdrawn from the stripping plate upon rotation of the table.

It will be noted that wherein there are shown six stripping plates for supporting these patterns, the invention is not limited to any particular number of stripping plates, as the number thereof may be varied, depending upon the pattern to be cast. For simple patterns only four stripping plates need be used, and the peening head eliminated, but on some complicated patterns it may be necessary to use five, six or even eight stripping plates, as it may be necessary to employ additional peeing heads or other devices for properly forming the molds.

The invention claimed is:

1. A molding machine comprising a supporting base, a table rotatably mounted on said base, a plurality of radially positioned stripping plates, means for rotating said table on said base, a sprue pin adapted to extend through said table, and means for withdrawing said pin when said table is turned to a given position.

2. A molding machine comprising a supporting base, a table rotatably mounted on said base, a plurality of radially positioned stripping plates, means for rotating said table on said base, a sprue pin adapted to extend through said table, a bell crank pivotally mounted on said table having one end connected with said sprue pin, and a cam adapted to be engaged by the other end thereof for withdrawing the same when said table is turned to a given position.

3. A molding machine comprising a supporting base, a table rotatably mounted on said base, a plurality of radially extending stripping plates, a compressing head, a support therefor mounted on said base so as to hold said head over one of said stripping plates, a plunger mounted in said base for engaging said table and arresting its movement when one of said stripping plates is moved under said head, and means connected with said head for causing said plunger to release said table and permit the rotation thereof when said head is elevated.

4. A molding machine comprising a supporting base, a table rotatably mounted on said base, a plurality of radially extending stripping plates, a compressing head, a support therefor mounted on said base so as to hold said head over one of said stripping plates, a plunger mounted in said base for engaging said table and arresting its movement when one of said stripping plates is moved under said head, and an actuating rod having one end connected with said head and the other end to said plunger whereby the upward movement of said head will draw said plunger downwardly out of engagement with said table and permit the rotation thereof.

5. A molding machine comprising a supporting base, a table rotatably mounted on said base, a compressing head, a support therefor, driving mechanism for reciprocating said head, driving mechanism for rotating said table, a single driving means, and a double magnetic clutch driven by said driving means and having a pair of independent clutch faces connected with the respective driving mechanism, whereby said head and table may be driven independently of each other.

6. A molding machine comprising a supporting base, a table rotatably mounted on said base, a compressing head, a support therefor, driving mechanism for reciprocating said head, driving mechanism for rotating said table, a single driving means, a double magnetic clutch driven by said driving means and having a pair of independent clutch faces connected with the respective driving mechanism, whereby said head and table may be driven independently of each other, and an electric circuit connected to said magnetic clutch and controlled by said table and head for causing said clutch faces to be thrown in and out of driving engagement at timed intervals.

7. A molding machine comprised of a supporting base, a table rotatably mounted on said base, a compressing head, a support therefor mounted on said base so as to hold said head over said table, driving mechanism for reciprocating said head, driving mechanism for rotating said table, a latch for arresting the movement of said table controlled by the movement of said head, a single driving means, a double magnetic clutch driven by said driving means and having a pair of independent clutch faces connected with the respective driving mechanisms whereby said head and table may be driven independently of each other, an electric circuit for controlling said clutch, and a switch connected with said latch for making and breaking the circuit to said clutch.

8. A molding machine comprising a supporting base, a table rotatably mounted on said base, a compressing head, a support therefor mounted on said base so as to hold said head over said table, driving mechanism for reciprocating said head, driving mechanism for rotating said table, a single driving means, a double magnetic clutch driven by said driving means and having a pair of independent clutch faces connected with the respective driving mechanism whereby said head and table may be driven independently of each other, an electric circuit for controlling said clutch, and a circuit breaker connected with each of said driving mechanisms for making and breaking the circuit to said clutch.

9. A molding machine comprising a supporting base, a rotatable table mounted on said base, a compressing head, a mounting for supporting said head above said table, a shaft connected with said head and extending into said mounting for supporting said block above said table, a reciprocating head slidably positioned in said mounting and connected with said shaft for reciprocating the same, an eccentric pivoted on said mounting for engaging and causing the reciprocal movement of said block, and means for rotating said eccentric for reciprocating said head.

10. A molding machine comprising a rotatable supporting table, a reciprocating compressing head associated therewith, a reciprocating peening head, a single means for rotating said table and reciprocating both of said heads at timed intervals, means for arresting the movement of said table, and means for controlling said driving means whereby said table, compressing and peening heads and arresting means will be independently actuated and timed with respect to each other.

11. A molding machine comprising a supporting base, a rotatable table mounted on said base, a compressing head, a peening head, mounts for supporting each of said heads independently of each other above said table, shafts connected with each of said heads and extending into said mounts, means positioned within said mounts and connected with said shafts for reciprocating the same, and a single means for actuating said reciprocating means and rotating said table at predetermined timed intervals.

In witness whereof, I have hereunto affixed my signature.

JAMES A. MURPHY.